United States Patent [19]
Lee et al.

[11] Patent Number: 5,729,393
[45] Date of Patent: Mar. 17, 1998

[54] OPTICAL FLYING HEAD WITH SOLID IMMERSION LENS HAVING RAISED CENTRAL SURFACE FACING MEDIUM

[75] Inventors: Neville K. S. Lee, Kowloon, Hong Kong; John S. Berg, Bellingham, Mass.

[73] Assignee: Digital Papyrus Corporation, Holliston, Mass.

[21] Appl. No.: 638,349

[22] Filed: Apr. 26, 1996

Related U.S. Application Data

[60] Provisional application No. 60/014,779, Apr. 3, 1996.

[51] Int. Cl.$^6$ ............................................. G02B 7/02
[52] U.S. Cl. ...................... 359/819; 359/808; 359/811; 369/44.15
[58] Field of Search ............................ 359/811, 819, 359/808, 813, 814; 369/269, 273, 44.15

[56] References Cited

U.S. PATENT DOCUMENTS

| | | | |
|---|---|---|---|
| 4,488,776 | 12/1984 | Skinner | 359/808 |
| 4,948,226 | 8/1990 | Ozaki | 359/819 |
| 5,125,750 | 6/1992 | Corle et al. | 359/819 |
| 5,497,359 | 3/1996 | Mamin et al. | 369/44.15 |

FOREIGN PATENT DOCUMENTS

| | | |
|---|---|---|
| 0 363 966 A2 | of 0000 | European Pat. Off. |
| 0 405 742 A2 | of 0000 | European Pat. Off. |
| 0 409 468 A2 | of 0000 | European Pat. Off. |
| 0 549 236 A2 | of 0000 | European Pat. Off. |
| 0 639 830 A1 | of 0000 | European Pat. Off. |
| 0 594 193 A2 | of 0000 | Japan. |
| 07 254185 A | of 0000 | Japan. |

OTHER PUBLICATIONS

IBM Technical Disclosure Bulletin, vol. 38, No. 12, Dec. 1995, Armonk, NY, U.S., p. 51, "Slider–mounted solid immersion lens for optical storage".

IBM Technical Disclosure Bulletin, vol. 37, No. 10, Oct. 1994, Armonk, N.Y. U.S., p. 501, "Use of a Diamond–Like Carbon Thin–Film on a Silicon/Heat Sink".

Mansfield, S.M., Optic Letters, vol. 18, No. 4, 15 Feb. 1993, USA, pp. 305–307, "High–numerical–aperture lens system for optical storage".

*Primary Examiner*—Loha Ben
*Attorney, Agent, or Firm*—Wolf, Greenfield & Sacks, P.C.

[57] ABSTRACT

An air bearing assembly for an optical drive carries a solid immersion lens (SIL) having a bottom surface facing the disk contoured such that a central region where the optical path exits the bottom surface is closest to the recording medium regardless of perturbations in the attitude of the air bearing and neighboring points on the surface surrounding the central region recede for clearance but function at least partly as an air bearing. In one embodiment the bottom surface of the SIL has a radius of about 10 meters.

25 Claims, 3 Drawing Sheets

OPTICAL FLYING HEAD WITH SOLID IMMERSION LENS HAVING RAISED CENTRAL SURFACE FACING MEDIUM

CROSS REFERENCE TO RELATED APPLICATIONS

This application claims the benefit of U.S. provisional application Ser. No. 60/014,779 filed Apr. 3, 1996 by Neville K. S. Lee and John S. Berg entitled "Optical Flying Head With Solid Immersion Lens With Curved Surface Facing Media".

BACKGROUND OF THE INVENTION

The present application is related to head design for optical data storage systems.

The term "optical" as used herein is intended to apply to any directed energy beam system including, for example, visible light, infrared radiation or electron beam.

Air bearings, previously used with magnetic disk drives, have recently been proposed for optical storage systems. In particular, a micro objective lens system can be mounted directly on the air bearing slider. While it is desirable to have a single element (singlet) for a focusing objective lens, more than one lens element may be required. It is well known that the focused spot size, which limits the recording density, is proportional to $\lambda/NA$, where $\lambda$ is the wavelength of the optical beam and NA is the numerical aperture. Thus, there are two avenues available for decreasing spot size: decreasing wavelength and increasing the numerical aperture. Inexpensive lasers in the red range are customarily used for optical drives. Choosing a laser with a significantly shorter wavelength in the blue region, for example, entails a very significant cost increase. Numerical aperture on the other hand is related to the refractive index of the medium through which the light beam is passing. If one uses a lens with a high index of refraction and positions the lens very close to the recording layer on the disk, a high NA can be achieved. One way in which this can be accomplished is to use a solid immersion lens (SIL), e.g., having a spherical upper surface which intercepts the focused beam from the objective lens and conducts the beam to the recording medium.

SUMMARY OF THE INVENTION

According to one aspect of the invention, an air bearing assembly for an optical drive carries a solid immersion lens (SIL) or other optical element having a bottom surface facing the disk contoured such that a central region where the optical path exits the bottom surface is closest to the recording medium regardless of perturbations in the attitude of the air bearing and neighboring points on the surface surrounding the central region recede for clearance but function at least partly as an air bearing. In one embodiment the radius of curvature of the bottom of the SIL is defined as a specific function of the track pitch and evanescent wave extinction distance.

In various embodiments the SIL bottom surface is formed with one or more central projections or rounded protuberances and the surface is coated with transparent or nontransparent coating. If nontransparent an aperture is defined to accommodate the optical path.

In another aspect of the invention, the aperture in the coating is defined by blasting a pinhole in the uniformly applied layer with a UV or other shorter wavelength laser via the regular optical path.

In still another aspect of the invention, the contour on the bottom surface is at least partly applied by lapping the bottom surface after the SIL is mounted to the slider.

For increased reliability of the optical drive, a special surface contour on the bottom of the SIL profiled as described assures that the optical path through the SIL is the closest to the disk to achieve high NA while the majority of the SIL is not in danger of hitting the surface when the air bearing is perturbed during seeks or runout over the disk. However, the radius of curvature may be chosen to be large enough such that the lens surface still provides a lifting force to maintain the desired flying height. Specific values can be determined which help avoid crosstalk between tracks on the disk.

DETAILED DESCRIPTION

Figure 2:
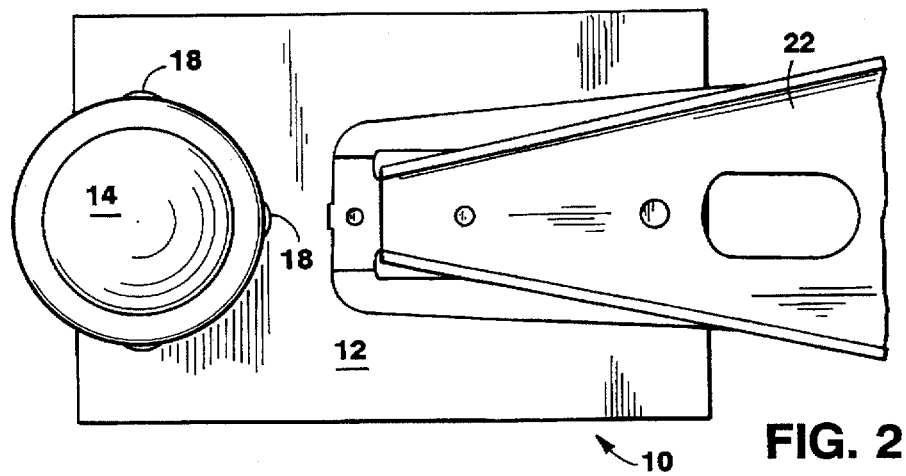
FIG. 2 is a top view of the air bearing assembly of FIG. 1 rotated so that the trailing edge is to the left.
Figure 3:
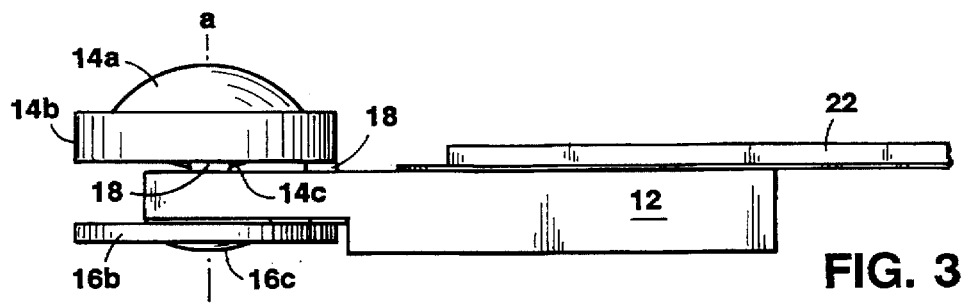
FIG. 3 is a side view of the air bearing assembly as shown in FIG. 2.
Figure 4:
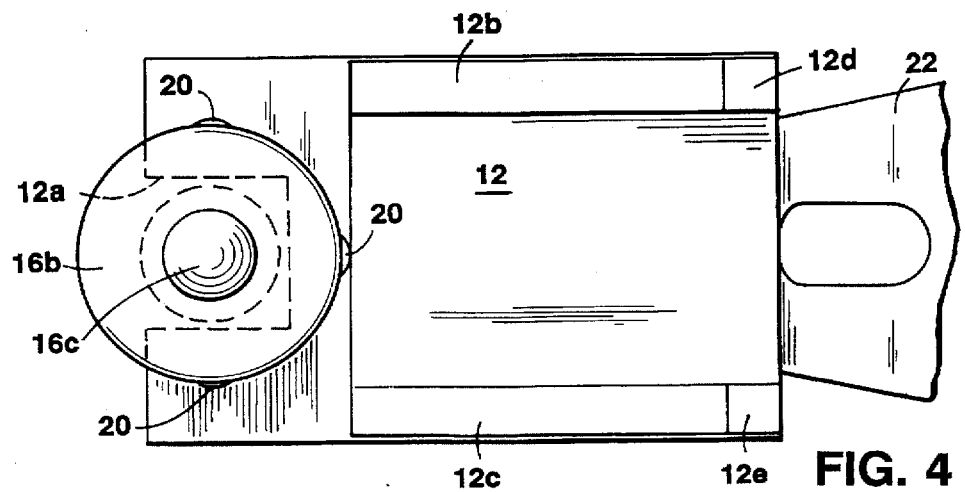
FIG. 4 is a bottom view of the air bearing assembly as shown in FIG. 2, with portions shown in phantom.

FIGS. 1 through 4 show an improved optical air bearing assembly 10 for an optical disk drive comprising an air bearing slider 12, an aspheric objective lens 14 and SIL 16 mounted in optical alignment on opposite side of the slider 12. The air bearing slider 12 is made of a stiff light ceramic with a coefficient of thermal expansion that closely matches that of the optical elements mounted to the slider. One material choice for the slider is $Al_2O_3$-TiC available from Sumitomo under the name AC2. The slider is configured to have a slot 12a in the trailing edge to receive the optical elements and a pair of rails 12b and 12c on the bottom forming a portion of the air bearing surface. At the leading edge of the slider, the rails each have a slight ramp or tap 12d, 12e (FIG. 4).

Figure 1:
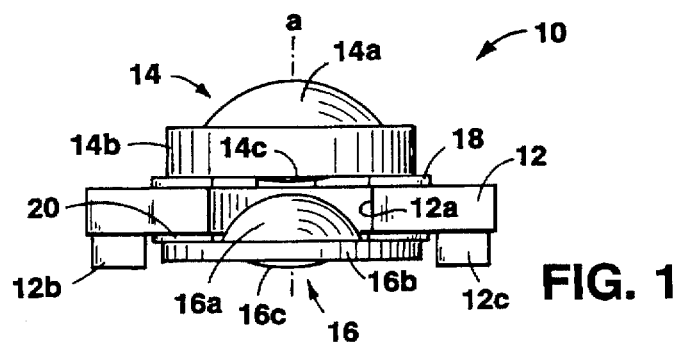
FIG. 1 is an end view of the trailing edge of an optical air bearing assembly according to the invention.

The objective lens 14 is a molded glass element having an aspheric upper surface 14a, an integral circular mounting flange 14b and a lower curved convex surface 14c through which the focused beam exits toward the recording medium, i.e., the spinning disk. The SIL 16 is a similarly molded glass element having an upper spherical surface 16a, an integral mounting flange 16b and a bottom curved convex surface 16c of radius r. The centers of curvature of all of the curved surfaces of the lenses 14 and 16 lie on the optical axis a (FIGS. 1, 3). The bottom surface of the flange 16b and curved surface 16c on the SIL 16 also form part of the air bearing surface. The optical elements are each mounted to the slider with three bond joints 18, 20 (FIGS. 2, 4). Preferably, the SIL is bonded to the slider first and then the objective lens is optically aligned carefully while allowing for shrinkage of the objective lens bond joints during curing.

The glass for the optical elements 14 and 16 is chosen to have a high refractive index, for example, in a range of from 1.5 to 2.0. One choice BK7 has a 1.6 index of refraction. In one embodiment, the outer diameter of the flange 14b is 2.4 mm.

Air bearing slider assembly 10 is connected to a linear or rotary actuator by a conventional flexure hinge 22, as shown in FIGS. 2–4. The air bearing and flexure hinge interact to keep the slider flying a short distance above the spinning surface of the disk. The preferred distance between the bottom of the SIL and the disk surface called the head to disk separation distance or flying height is within the evanescent wave extinction distance, i.e., one wavelength $\lambda$ or less.

Forces produced by the seek actuator acceleration tend to roll the slider side to side when the head seeks another track on the disk. In addition, the waviness or vertical runout of the disk forces the head to have a dynamic pitch motion as it responds to the rotating disk. As a result, it is impossible for the slider to maintain a continuously fixed attitude with respect to the nominal plane of the disk. In order to accommodate changes in attitude, the curved surface 16c facing the disk has a radius preferably less than 10 meters to assure that the focused point is always the surface closest to the medium while all other neighboring points recede from the media for increased clearance.

A curved surface such as that shown in FIGS. 1–4 for the bottom of the SIL assures that the optical path through the SIL is the closest to the disk and that the majority of the SIL is not in danger of hitting the surface when the air bearing is perturbed. However, the radius of curvature may be chosen to be large enough such that the lens surface still provides a lifting force to maintain the desired flying height.

There is another more critically determined set of values for the radius of the optical surface for which performance can be optimized. Specifically, the radius is selected as a function of the evanescent wave extinction distance, the desired recording track pitch and the minimum flying height. The objective is to maximize efficiency of wave coupling from the laser spot, typically 0.3 µm, to the targeted track, while at the same time minimizing coupling with adjacent tracks. The net result is a reduction in cross talk between tracks thus permitting a greater track density and hence higher recording density.

The value of the radius is a particular solution for the surface with a spherical surface or approximately spherical surface with the intent as stated above:

$$R = \frac{1}{2}\left(\frac{T^2}{E} - E\right) \text{ for Separation} \ll R$$

where
R=radius of curvature of the surface,
T=track pitch,
E=evanescent wave extinction distance, which can either be a value approximately one wavelength $\lambda$ of the radiation source or a value less than $\lambda$ but significantly greater than the minimum separation distance between the coupled central region of the SIL and the disk, and
Separation=the distance between the SIL and the medium surface.

The value of E also depends on the detector. Observing the foregoing mathematical relationship in choosing the bottom surface contour can reduce noise from adjacent tracks in addition to assuring that the optical path is through the closest part of the SIL while providing a reasonable air bearing with the bottom surface of the SIL surrounding the central region and reducing the possibility of head disk interference.

Figure 5:
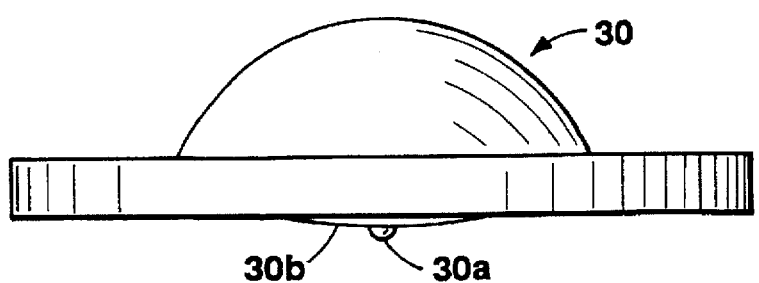
FIG. 5 is a side view of an alternatie embodiment of the SIL with an additional curved central projection on the bottom surface.

Alternative designs for the bottom surface of the SIL are shown in FIGS. 5–10. Each has in common with SIL 16 of FIGS. 1–4 an integral spherical upper surface, lower curved surface and circular flange for mounting the SIL to the bottom of the slider. In addition, a compound curved surface configuration can be used on the bottom of the SIL. As shown in FIG. 5, SIL 30 has a locally tight radius rounded protrusion or bump 30a formed in the central region on the optical axis surrounded by a curved surface 30b with an approximately 10 meter radius of curvature or less globally for head/disk interference, forming the air bearing surface.

Figure 6:
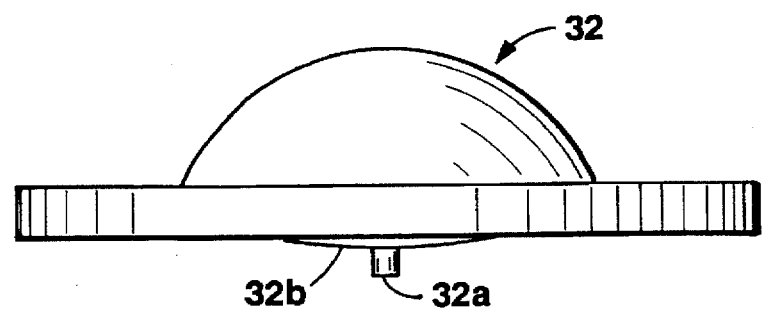
FIG. 6 is a side view of another embodiment of the SIL having a generally cylindrical projection from the center of the bottom surface.

In FIG. 6, another embodiment SIL 32 is equipped with an integrally molded projection or boss 32a of cylindrical shape. The optical beam is delivered to the medium through boss 32a.

In the central protrusion embodiments a very high effective NA of the system serves to increase efficiency of funneling light into and out of the protrusion. The NA for the system should be greater than 1.) The optical protrusion again propagates the evanescent wave and low NA rays to the medium surface. The length and width of the protrusion determine the track pitch and linear bit density achievable (and limited by the separation distance).

Figure 7:
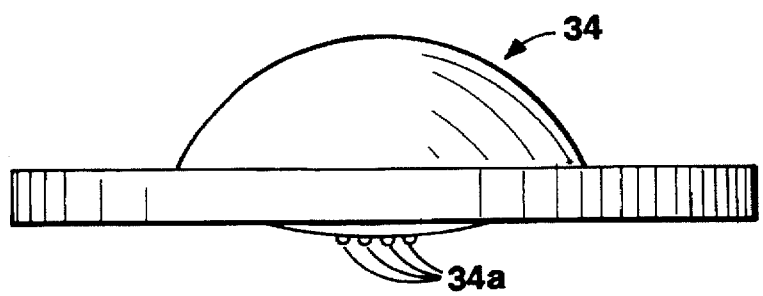
FIG. 7 is a side view of another embodiment of the SIL with a plurality of curved projections on the bottom surface.

As shown in FIG. 7, an array of multiple protrusions or bumps 34a on the SIL 34 air bearing surface can be integrally formed or appended with material of the same refractive index so that the objective lens can be focused over the SIL at any opportune one of the protrusions. The optical path is chosen through only one of the protrusions at any given time. Providing this choice minimizes alignment difficulty.

Figure 8:
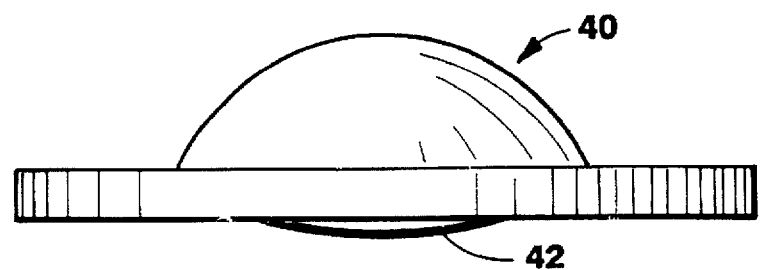
FIG. 8 is a side view of another embodiment of the SIL with a transparent coating on the bottom surface.

In FIG. 8, another embodiment SIL 40 has a convex radiused surface on the bottom like surface 16c of SIL 16 in FIGS. 1–4; however, in this embodiment the entire bottom surface receives a transparent coating 42.

Coating the air bearing surface of the SIL may serve several purposes. A low surface energy extremely smooth, hard coating can help to minimize friction with the medium and avoid accumulation of debris from the disk. The coating can be chosen to have approximately the same index of refraction when applied to the entire surface including the optical path as shown in FIG. 8. Possible materials for this purpose that could be sputtered on or deposited by chemical vapor deposition include SiN, diamond or diamond like carbon.

Figure 9:
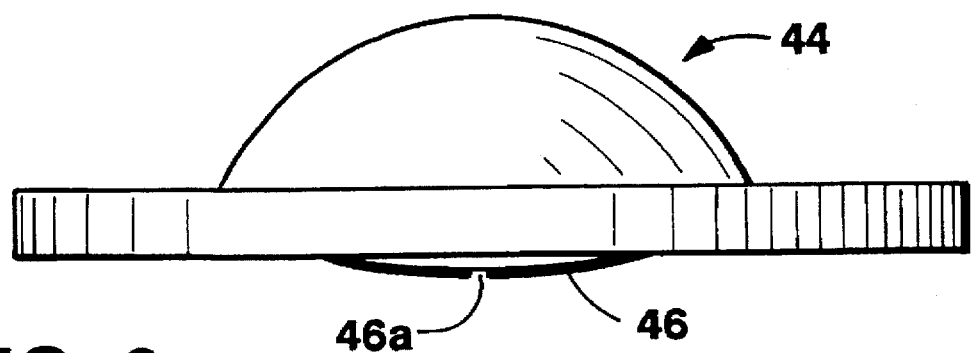
FIG. 9 is another embodiment of the SIL having a nontransparent coating on the bottom surface with a small central aperture defined in the coating on the optical path.

Alternatively, as shown for SIL 44 in FIG. 9, the coating 46 can be nontransparent with a central aperture 46a on the optical path but applied uniformly elsewhere on the air bearing surface of the SIL. This design permits the aperture itself to act as a spatial filter thus further reducing spot size and increasing recording density. The aperture required is thus equal to or smaller than the diffraction limited spot formed by the objective lens and SIL 44 alone.

One way of forming the aperture in the opaque coating during manufacture is to use a coating material highly absorptive in the UV region and then after the air bearing is assembled, using a high energy UV laser (e.g., excimer laser) to blast a pinhole in the coating. The short wavelength allows a focal spot smaller than the spot size of the less expensive red laser, e.g., AL-GaAs in the region 635–780

µm. The same optical path can be used for the UV laser during manufacture of the air bearing as is later used by the red optical reading laser in normal operation.

Figure 10:
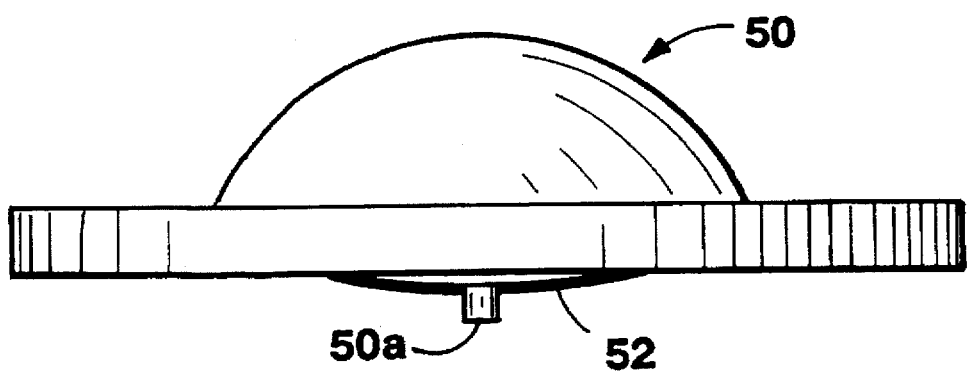
FIG. 10 is a side view of a variation on the SIL as shown in FIG. 6 having a nontransparent coating on the bottom surface except for a central projection of the type shown in FIG. 6.

In another embodiment, the SIL 50 of FIG. 10 incorporates a combination of a protrusion 50a (or multiple protrusions) and the apertured coating 52. The protrusion 50a may emanate from the aperture to couple the unstopped light. The coating may be applied uniformly and then apertured by means of a UV laser for example. Alternatively, the non-transmissive coating may be selectively applied only to the region of the SIL air bearing surface surrounding the protrusion by means of photolithographic techniques or other patterning technology.

While the SIL can be integrally molded with the desired bottom surface contour, the contour can also be machined onto the surface. For example, after the SIL is mounted to the slider, the slider and SIL assembly can be lapped with a cylindrical or spherical lapping machine assuring the lowest point will lie on the optical axis.

Other embodiments are within the appended claims.

What is claimed is:

1. An optical air bearing carrying an optical element through which an optical path is defined, the optical element having a bottom surface facing a recording medium contoured such that a central region where the optical path exits the bottom surface is closest to the medium regardless of perturbations in the attitude of the air bearing and neighboring points on the surface surrounding the central region recede but function at least partly as an air bearing.

2. The air bearing of claim 1, further comprising a coating on the bottom surface of the optical element.

3. The air bearing of claim 2, wherein the coating has a refractive index that matches that of the optical element.

4. The air bearing of claim 2, wherein the coating is diamond.

5. The air bearing of claim 2, wherein the coating is diamond like carbon.

6. The air bearing of claim 2, wherein the coating is SiN.

7. The air bearing of claim 1, wherein the coating is nontransparent and apertured at the central region to accommodate the optical path.

8. The air bearing of claim 7, wherein the coating is made of UV absorptive material and the aperture is formed by blasting a pinhole in the coating with a UV laser via the optical path.

9. The air bearing of claim 1, wherein the contour of the bottom surface has a radius of approximately 10 meters or less.

10. The air bearing of claim 1, wherein the contour of the bottom surface is a continuous curved surface.

11. The air bearing of claim 1, wherein the contour of the bottom surface is defined by the formula:

$$R = \frac{1}{2} \left( \frac{T^2}{E} - E \right) \text{ for Separation} \ll R$$

where

R=radius of curvature of the surface,

T=track pitch,

E=evanescent wave extinction distance, which can either be a value approximately one wavelength λ of the radiation source or a value less than λ, but significantly greater than the minimum separation distance between the central region of the optical element and the medium and Separation=the distance between the optical element and the medium.

12. The air bearing of claim 1, wherein the contour of the bottom surface surrounding the central region is designed to avoid hitting the surface when the air bearing is perturbed.

13. The air bearing of claim 1 wherein the air bearing further comprises a slider and the optical element is an SIL mounted to the slider, the slider and bottom surface of the SIL together forming the air bearing.

14. The air bearing of claim 13, wherein the contour of the bottom surface is formed by the bottom surface of the SIL.

15. The air bearing of claim 13, further comprising an objective lens mounted to the slider in optical alignment with the SIL.

16. The air bearing of claim 1, wherein the contour on the bottom surface includes a central protrusion.

17. The air bearing of claim 16, wherein the protrusion is in the form of a rounded protuberance of greater curvature than the surrounding region.

18. The air bearing of claim 16, wherein the protrusion is in the form of a cylindrical projection.

19. The air bearing of claim 16, wherein the bottom surface surrounding the protrusion has a surface coating of nontransparent material.

20. The air bearing of claim 1, wherein the bottom surface has a coating of nontransparent material with a clear aperture smaller than exit size of an optical read or write beam directed along the optical path thus serving as a spatial filter.

21. A method of making an optical air bearing comprising mounting an optical element to an air bearing slider, coating the bottom surface of the optical element with a nontransparent material, and blasting a pinhole through the optical element with a laser beam applied through the optical element.

22. The method of claim 21, wherein the laser beam has a shorter wavelength than the optical reading beam.

23. The method of claim 22, wherein an aperture smaller than the optical read beam exit size is thereby created to form a spatial filter.

24. A method of making an optical air bearing comprising mounting an optical element to an air bearing slider, and lapping the bottom surface of the optical element to form a curved contour.

25. The method of claim 24, wherein the slider and bottom surface of the optical element are lapped together.

* * * * *